United States Patent
Wang et al.

(10) Patent No.: US 11,340,803 B2
(45) Date of Patent: May 24, 2022

(54) METHOD FOR CONFIGURING RESOURCES, ELECTRONIC DEVICE AND COMPUTER PROGRAM PRODUCT

(71) Applicant: EMC IP Holding Company LLC, Hopkinton, MA (US)

(72) Inventors: Donglei Wang, Beijing (CN); Lei Gao, Beijing (CN); Xiaoang Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 21 days.

(21) Appl. No.: 16/369,441

(22) Filed: Mar. 29, 2019

(65) Prior Publication Data

US 2019/0384515 A1    Dec. 19, 2019

(30) Foreign Application Priority Data

Jun. 15, 2018 (CN) .......................... 201810620299.9

(51) Int. Cl.
*G06F 12/00* (2006.01)
*G06F 3/06* (2006.01)
*G06F 16/11* (2019.01)

(52) U.S. Cl.
CPC .......... *G06F 3/0631* (2013.01); *G06F 3/0604* (2013.01); *G06F 3/0653* (2013.01); *G06F 3/0673* (2013.01); *G06F 16/122* (2019.01)

(58) Field of Classification Search
CPC .... G06F 3/0631; G06F 16/122; G06F 3/0604; G06F 3/0653; G06F 3/0673
See application file for complete search history.

(56) References Cited

U.S. PATENT DOCUMENTS

| | | | |
|---|---|---|---|
| 7,281,106 B1 | 10/2007 | Arnan et al. | |
| 7,908,380 B1 * | 3/2011 | Chu | H04L 63/1458 709/227 |
| 9,262,217 B1 | 2/2016 | Xiang et al. | |
| 10,356,150 B1 * | 7/2019 | Meyers | H04L 65/607 |
| 10,733,022 B2 | 8/2020 | Guo et al. | |
| 2010/0153966 A1 * | 6/2010 | Arimilli | G06F 9/5066 718/105 |
| 2014/0068624 A1 * | 3/2014 | Fuller | G06F 9/5011 718/104 |
| 2014/0137110 A1 * | 5/2014 | Engle | G06F 9/505 718/1 |
| 2016/0308774 A1 * | 10/2016 | Astigarraga | H04L 43/0817 |
| 2017/0201574 A1 * | 7/2017 | Luo | H04L 67/34 |
| 2020/0044983 A1 * | 2/2020 | Zheng | H04L 47/822 |

* cited by examiner

*Primary Examiner* — Shawn X Gu
*Assistant Examiner* — Mohammad S Hasan
(74) *Attorney, Agent, or Firm* — BainwoodHuang

(57) ABSTRACT

Techniques perform resource configuration. The techniques involve determining, for a resource quota checking task for a file system on a storage system, a current workload of the storage system; in response to the workload exceeding a predetermined upper threshold, performing the resource quota checking task with a first number of processes; and in response to the workload being below a predetermined lower threshold, performing the resource quota checking task with a second number of processes, the second number being greater than the first number.

19 Claims, 2 Drawing Sheets

METHOD FOR CONFIGURING RESOURCES, ELECTRONIC DEVICE AND COMPUTER PROGRAM PRODUCT

CROSS-REFERENCE TO RELATED APPLICATION(S)

This application claims priority to Chinese Patent Application No. CN201810620299.9, on file at the China National Intellectual Property Administration (CNIPA), having a filing date of Jun. 15, 2018, and having "METHOD FOR CONFIGURING RESOURCES, ELECTRONIC DEVICE AND COMPUTER PROGRAM PRODUCT" as a title, the contents and teachings of which are herein incorporated by reference in their entirety.

FIELD

Embodiments of the present disclosure relate to the field of resource configuration of storage systems, and more specifically, to a method of resource configuration, device and computer program product.

BACKGROUND

In a storage system, in order to prevent a user from overusing space in a storage container in the file system, a predetermined quota is usually allocated to each user for collecting disk usage for each user in the file system. To acquire the correct disk usage, the quota needs to be updated when there is an Input/Output (IO) request. The quota can be enabled at a file system level or a sub-directory level by a storage administrator. In this case, the resource quota checking task needs to scan the whole file system to acquire an initial quota of the storage container for the user of the storage system or the latest quota usage after the system recovers from a fault. The quota checking task is intended for scanning the file system to obtain all inode information of the file system, which takes a long time to finish. In a traditional solution, the system will create 8 threads to perform the scanning concurrently for the file system to accelerate the procedure speed. Each thread handles one inode group in each iteration and calculates the usage.

SUMMARY

Embodiments of the present disclosure provide a solution for resource configuration of a storage system.

In a first aspect of the present disclosure, a method of resource configuration is provided. The method includes determining, for a resource quota checking task for a file system on a storage system, a current workload of the storage system; in response to the current workload exceeding a predetermined upper threshold, performing the resource quota checking task with a first number of processes; and in response to the current workload being below a predetermined lower threshold, performing the resource quota checking task with a second number of processes, the second number being greater than the first number.

In some embodiments, the method further includes in response to the current workload being between the predetermined upper threshold and the predetermined lower threshold, performing the resource quota checking task with a third number of processes, the third number being between the first number and the second number.

In some embodiments, the current workload is determined based on at least one of: a number of threads running in the storage system, utilization of a central processing unit (CPU) of the storage system, and utilization of a memory.

In some embodiments, the method further includes determining a priority of the resource quota checking task based at least in part on a number of processes for performing the resource quota checking task; and recording information and the priority of the resource quota checking task in a task list of the storage system, so as to schedule the resource quota checking task according to the priority.

In some embodiments, the priority of the resource quota checking task is further determined based on at least one of: the current workload of the storage system, and a running time of the resource quota checking task.

In a second aspect of the present disclosure, an electronic device is provided. The electronic device includes a processor; and a memory coupled to the processor, the memory having instructions stored therein, wherein the instructions, when executed by the processor, cause the device to perform actions. The actions include determining, for a resource quota checking task for a file system on a storage system, a current workload of the storage system; in response to the current workload exceeding a predetermined upper threshold, performing the resource quota checking task with a first number of processes; and in response to the current workload being below a predetermined lower threshold, performing the resource quota checking task with a second number of processes, the second number being greater than the first number.

In a third aspect of the present disclosure, a computer program product is provided. The computer program is tangibly stored on a computer-readable medium and including machine-executable instructions, the machine-executable instructions, when executed, causing a machine to perform the method according to the first aspect.

In a fourth aspect of the present disclosure, a computer-readable medium stored thereon with computer-readable instructions is provided. The computer-readable instructions, when executed, cause a device to perform the method according to the first aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION OF EMBODIMENTS

Figure 1:
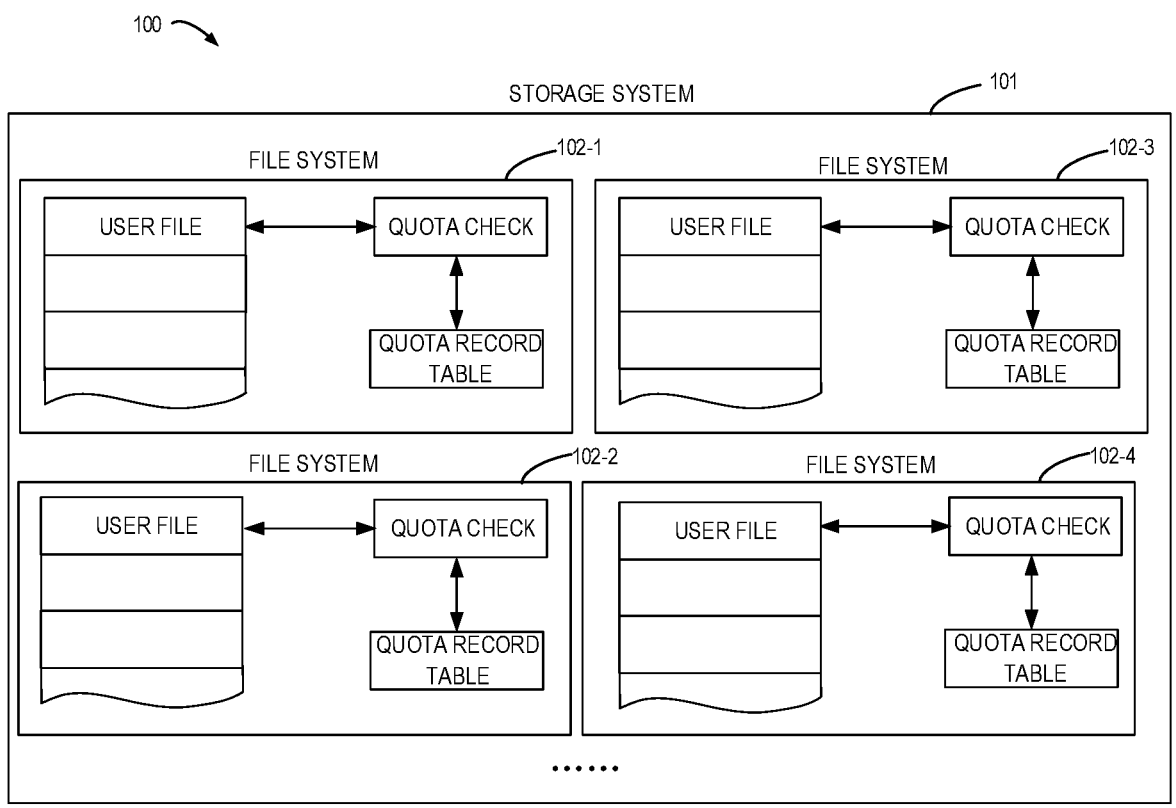
FIG. 1 illustrates a schematic diagram of an environment where embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principle of the present disclosure will be described with reference to the several example embodiments shown in the drawings. Although the drawings illustrate preferred embodiments of the present disclosure, it should be understood that the embodiments are described merely to enable those skilled in the art to better understand and further implement the present disclosure and is not intended for limiting the scope of the present disclosure in any manner.

As used herein, the term "comprises" and its variants are to be read as open-ended terms that mean "comprises, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least one further embodiment." The terms "first", "second" and so on may refer to same or different objects. The following text also can include other explicit and implicit definitions.

As used herein, the term "file" includes various formats of electronic files containing all kinds of contents, such as electronic documents, image files, video files, audio files or any other formats of files.

FIG. 1 illustrates a schematic diagram of an environment 100 where embodiments of the present disclosure can be implemented. The environment 100 includes a storage system 101. The storage system 101 in the present disclosure may be personal computers, servers, cloud-based servers or any other suitable storage systems 101. The storage system 101 includes several file systems 102-1, 102-2, 102-3 and 102-4, which are collectively known as file systems 102. Each file system 102 has several users. The users with permission may locally or remotely access user files in the corresponding file system 102.

In order to prevent users from overusing space of a storage container in the storage system 101 in the file systems 102, a quota for the space with predetermined capacity is usually allocated to each user. The quota is used for collecting disk usage for each user in the file system. To implement the quota functionality, the file system 102 will maintain a quota record table for each user. In each modification operation (e.g., writing/removing/chown etc.) for the storage container in the storage system 101, the system will apply changes to the CurrentSpaceUsage field recorded by the current file system 102 and check whether a limit of quota is exceeded. If the checking passes (i.e., the limit would not be exceeded even if after the changes are applied), the changes will be committed to the quota record table. Otherwise, the operation will be rejected and "quota exceeding" error will be returned. The quota record table is usually modified in the same transaction as the modification operation, which ensures consistency between the information in the quota record table and the information actually recorded in the file system 102.

In some cases, it is required to check the quota for each user in the file system 102. The quota checking task is intended for updating or correcting the initial quota for users in the file system 102 or the latest quota usage after the system recovers from a fault as needed. To keep consistency of the quota usage, each file system 102 can only have one running resource quota checking task at the same time.

The current resource quota checking task may be triggered by an appropriate situation. For example, when a new quota needs to be created for the file system 102, due to the absence of storage container usage information of users on the file system 102, the file system 102 will trigger a quota checking task at this time to automatically collect the initial usage. In some cases, there may be an inconsistency between the information in the quota record table and the information actually recorded by the file system 102. At this moment, it is also required to trigger the resource quota checking task.

However, in some cases, the file system includes many user files, which results into a huge workload for the quota checking. If the total amount of the file systems that need to run quota checking is large, the total number of threads will increase drastically. In addition, this introduces excessive additional workloads, such that the system cannot timely process other IO requests. On the other hand, if the workload of the storage system is low, employing 8 scanning threads for every resource quota checking task cannot fully utilize the resources of the storage system, resulting in waste of the resources of the storage system. Moreover, this may cause a longer time to be spent on processing the file system having a plurality of sub-file folders and files.

Embodiments of the present disclosure provide a method of resource configuration to solve or at least partially solve the above problems during the traditional quota checking task. In the method of resource configuration according to the embodiments of the present disclosure, after the resource quota checking task is triggered, the storage system 101 adaptively allocates the number of threads for performing the resource quota checking task according to the current workload of the storage system 101. The method of resource configuration according to embodiments of the present disclosure also may be implemented for the resource quota checking tasks that have been running. For such resource quota checking tasks that have been running, the system periodically (such as every 10 minutes) checks the task and adjusts the number of threads for performing the resource quota checking task according to the current workload situation of the storage system 101 during each checking task.

Figure 2:
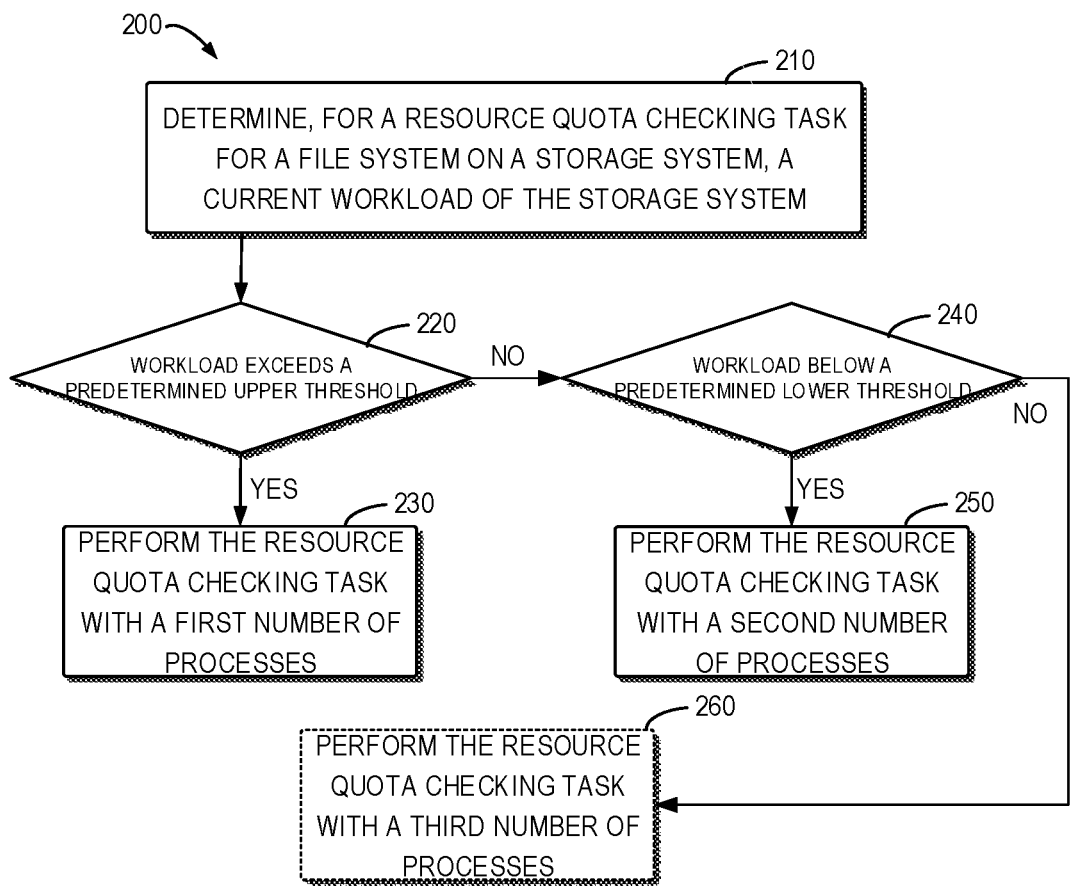
FIG. 2 illustrates a flowchart of a process for resource quota checking task according to one embodiment of the present disclosure.

Embodiments of the present disclosure will be described in details with reference to the drawings. FIG. 2 illustrates a flowchart of a procedure 200 for resource configuration according to embodiments of the present disclosure. The procedure 200 can be implemented by the storage system 101, for example, can be implemented by a control module of the storage system 101. In other embodiments, the procedure also can be implemented by a computing device independent of the storage system 101. For the sake of discussion, the procedure 200 is discussed in combination with FIG. 1 and the explanation is provided by the example of the storage system 101 performing the procedure 200.

At block 210, the current workload of the storage system 101 is determined in the first place regarding the resource quota checking task for the file system on the storage system. At block 220, if the determined workload exceeds a predetermined upper threshold, which indicates that the storage system 101 is in a very busy state, then a small amount (known as first number for the sake of discussion) of processes (for example may be threads) is employed to perform the resource quota checking task at block 230.

At block 240, if the determined workload is below a predetermined lower threshold, which indicates that the storage system 101 is in an idle state, then a large amount (known as second number for the sake of discussion) of threads may be employed to perform the resource quota checking task at block 250. In this way, the resources of the storage system 101 may be fully utilized and the speed of the resource quota checking task is accelerated.

By using the resource quota checking task according to embodiments of the present disclosure, the thread number of the resource quota checking task can be adaptively adjusted based on the workload of the storage system 101. In this way, the resources of the storage system 101 can be utilized in a more reasonable manner. When the storage system 101 is busy, fewer threads are employed to perform the resource quota checking. This guarantees the response speed of the storage system 101 when handling other IO requests. When the storage system 101 is idle, more threads may be employed to perform the resource quota checking, which can more sufficiently utilize the resources of the storage system 101 and accelerate the speed of the quota checking.

Furthermore, the workload of the storage system 101 changes all the time. The method of resource configuration according to embodiments of the present disclosure may also dynamically adjust the number of threads for the resource quota checking tasks, which makes the workload of the storage system 101 more balanced and reasonable.

In some embodiments, if the workload is between the predetermined upper threshold and the predetermined lower threshold as shown in FIG. 2, a third number of threads may be employed to perform the quota checking task at block 260. The third number is between the first number and the second number. Such an arrangement further refines the conditions of the workload of the storage system 101 and different numbers of threads are allocated based on the refined result. In this way, the resource configuration of the storage system 101 may be more refined and efficient. Of course, it should be appreciated that a further refinement may also be configured to more precisely control or adjust the resources of the storage system 101.

In some embodiments, in order to prevent the resource quota checking task from occupying too many resources, a maximum threshold of the number of the threads may be set. For example, the maximum threshold of the number of the threads may be set to not exceed twice the number of cores of a Central Processing Unit (CPU) of the storage system 101. For example, in some embodiments, the maximum threshold can be set to be no greater than 32 for the storage system 101 having two 8-core CPUs.

Of course, it should be understood that the above embodiments regarding the designated maximum threshold are described merely for illustration, without suggesting any limitations as to the scope of the present disclosure. It is also possible that the maximum threshold of the number of the threads is designated according to any other appropriate indicators. For example, in some embodiments, the maximum threshold may be designated based on the size of the memory of the storage system 101 among other indicators.

For the resource quota checking task that are currently running, if the re-determined number of the threads by the method according to embodiments of the present disclosure is greater than the previous number of the threads, the storage system 101 will directly redistribute a difference number of threads for the task, such that the resource quota checking task is performed by the re-determined number of threads. For example, the previous number of the threads for a certain task is 5 and the re-determined number of threads is 8, so the storage system allocates three new threads for the task.

On the other hand, if the re-determined number of threads is smaller than the previous number, in order to ensure the integrity of the data of the resource quota checking task currently being performed, the file system 102 will terminate the threads after the threads finish checking one inode group until the number of the threads equals to the re-determined number. For example, if the previous number of the threads for one task is 8 and the re-determined number is 5, the file system 102 will terminate three threads after the three threads finish checking the corresponding one inode group.

In some embodiments, the workload of the storage system 101 may be determined based on at least one of, including but not limited to: the number of currently running threads of the storage system 101, utilizations of CPU and the memory etc. For example, for the newly triggered or already established resource quota checking task, the number of running threads in the storage system 101 may be determined in the first place. When the number of the running threads exceeds the predetermined upper threshold, which indicates that the storage system 101 is currently busy, thereby the number of threads for the resource quota checking tasks may be correspondingly allocated.

Of course, it should be understood that the above listed indicators for determining the workload of the storage system 101 are described merely for illustration, without suggesting any limitations as to the scope of the present disclosure. Any other suitable manners or indicators are possible. For example, in some embodiments, the workload of the storage system 101 may also be determined based on the power source load of the storage system 101.

In addition to allocating threads to the resource quota checking task when the task is triggered as mentioned above, the method according to embodiments of the present disclosure also re-checks the tasks that have been performed to reallocate the threads. In some embodiments, in order to more efficiently and more reasonably check the resource quota checking tasks that have been running one by one, a concept of priority is introduced. Specifically, when initially allocating the number of the threads for the resource quota checking tasks, the system may determine the priority of the resource quota checking tasks at least according to the determined number of threads.

In some embodiments, the priority may be divided into high, default and low. For example, the high priority may correspond to the tasks with the allocated number of threads being equal to or greater than 8; the default priority may correspond to tasks with the allocated number being greater than 2 and smaller than 8; and the low priority may correspond to the tasks with the allocated number equaling to 1. For example, in some embodiments, the initially allocated number of threads for a certain task is 8, so the task will be added into a high priority list and the system will accordingly store the information and the priority record of the resource quota checking task into the task list. The term "add" mentioned here refers to inserting into the last line of the corresponding priority list. In some embodiments, the task may also be inserted into other positions of the corresponding priority list, e.g., inserted into the first line of the priority list, which will be further explained hereinafter.

Of course, it should be understood that the above mentioned priority category and the range of the number of the threads corresponding to each priority are described merely for illustration, without suggesting any limitations as to the scope of the present disclosure. Any other suitable categories or ranges are also possible. For example, in some embodiments, the range of the number of threads corresponding to each priority may be adjusted at least according to the workload of the system.

When checking the resource quota checking tasks that have been running, the system will check the tasks one by one from high priority to low priority. In this way, the number of threads for each resource quota checking task may be dynamically adjusted. For example, in some embodiments, when the resource quota checking tasks in the low priority list are checked, if the determined current workload of the storage system 101 is below the predetermined lower threshold, more numbers of threads may be allocated to the tasks in the low priority list, such as 8, so as to more rapidly perform the tasks. The tasks accordingly may also be added in the high priority list.

On the other hand, in some embodiments, when the resource quota checking tasks in the high priority list are checked, if the determined current workload of the storage system 101 exceeds the predetermined upper threshold, the number of threads allocated to the tasks may be reduced, such as by 2, so as to reduce the workload of the storage system 101. These tasks accordingly may be added into the low priority list or inserted into the first line of the low priority list. Of course, it should be understood that the above described embodiments are described merely for illustration, without suggesting any limitations as to the scope of the present disclosure. Any other suitable steps or manners are also possible.

Furthermore, when checking the resource quota checking tasks that have been running, is the system also firstly confirms whether the on-going checking has reached the last inode group in some embodiments. If it has been confirmed that the performed checking task has reached the last inode group, it indicates that the checking task will end soon and it is meaningless to adjust the threads. In this case, the system will skip this checking task and proceeds to the next checking task. On the other hand, if it has been confirmed that the on-going checking does not reach the last inode group, the system will continue to confirm the system load for the checking task and correspondingly adjust the number of threads for performing the checking task.

In some embodiments, the system may further determine the priority of the resource quota checking tasks based on other indicators. For example, in some embodiments, the system may also determine the priority of the resource quota checking task based on at least one of the current workload and a running time of the resource quota checking tasks.

Specifically, in some embodiments, if the execution time of the resource quota checking task is long, e.g., longer than a certain set threshold (such as one hour), and it has been determined that the current workload of the storage system 101 is low (below the predetermined lower threshold), a high priority is allocated to the task. Furthermore, the number of the threads may be set to be the maximum allowable number of threads of the system, such that the task can operate more rapidly. On the other hand, for the tasks which have been in the high priority list, if the resource quota checking task has exceeded a predetermined threshold, more numbers of threads (e.g., 8) may also be allocated to the tasks and the tasks are inserted into the first line of the default priority even if it is determined that the current workload of the storage system 101 is high (exceeding the predetermined upper threshold). Moreover, in some embodiments, for the tasks that have been at the default priority conforming to the situations as mentioned above, other appropriate numbers (such as 2) of threads may be set and the tasks may be inserted into the first line of the low priority.

Of course, it should be understood that the above embodiments about priority determination are described merely for illustration, without suggesting any limitations as to the scope of the present disclosure. Any other suitable manners or steps are also possible. For example, in some embodiments, the priority of the tasks may also be adjusted by any other suitable indicators.

Figure 3:
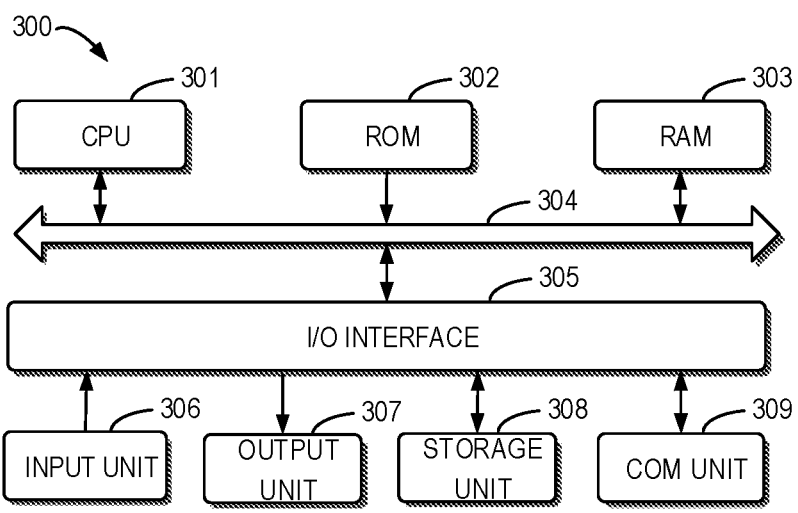
FIG. 3 illustrates a block diagram of an example device for implementing embodiments of the present disclosure.

FIG. 3 illustrates a schematic block diagram of an example device 300 for implementing embodiments of the present disclosure. The device 300 can implement the procedure 200 of FIG. 2. The device 300 may be a device independent of the storage system 101 or may be integrated in the storage system 101. As shown, the device 300 includes a central process unit (CPU) 301, which can execute various suitable actions and processing based on the computer program instructions stored in the read-only memory (ROM) 302 or computer program instructions loaded in the random-access memory (RAM) 303 from a storage unit 308. The RAM 303 may also store all kinds of programs and data required by the operations of the device 300. CPU 301, ROM 302 and RAM 303 are connected to each other via a bus 304. The input/output (I/O) interface 305 is also connected to the bus 304.

A plurality of components in the device 300 are connected to the I/O interface 305, including: an input unit 306, such as keyboard, mouse and the like; an output unit 307, e.g., various kinds of display and loudspeakers etc.; a storage unit 308, such as disk, optical disk etc.; and a communication unit 309, such as network card, modem, wireless transceiver and the like. The communication unit 309 allows the device 300 to exchange information/data with other devices via the computer network, such as Internet, and/or various telecommunication networks.

The processing unit 301 executes the above described various procedures and processing, such as procedure 300. For example, in some embodiments, the procedure 300 may be implemented as computer software programs or computer program products tangibly included in the machine-readable medium, such as non-transitory computer-readable medium, e.g., storage unit 308. In some embodiments, the computer program may be partially or fully loaded and/or mounted to the device 300 via ROM 302 and/or communication unit 309. When the computer program is loaded to RAM 303 and executed by the CPU 301, one or more steps of the above described procedure 300 may be executed. Alternatively, in some other embodiments, the CPU 301 may be configured via other suitable manners (such as by means of firmware) to execute one or more steps of the procedure 300.

The present disclosure relates to method, apparatus, computer program product, computer-readable storage medium and the like. The computer-readable storage medium is stored thereon with computer-readable program instructions for executing various aspects of the present disclosure.

The computer-readable storage medium may be a tangible apparatus that maintains and stores instructions utilized by the instruction executing apparatuses. The computer-readable storage medium may be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein may be downloaded from the computer-readable storage medium to each computing/processing device, or to an external computer or external storage via Internet, local area network, wide area network and/or wireless network. The network may include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure may be assembly instructions, instructions of instruction set architecture (ISA), machine instructions, machine-related instructions, microcode, firmware instructions, state setting data, or source codes or target codes written in any combinations of one or more programming languages, wherein the programming languages consist of object-oriented programming languages, such as Smalltalk, C++ and the like, and traditional procedural programming languages, e.g., C language or similar programming languages. The computer-readable program instructions may be implemented fully on the user computer, partially on the user computer, as an independent software package, partially on the user computer and partially on the remote computer, or completely on the remote computer or server. In the case where remote computer is involved, the remote computer may be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit may execute computer-readable program instructions to implement various aspects of the present disclosure.

Each aspect of the present disclosure is disclosed here with reference to the flow chart and/or block diagram of method, apparatus (system) and computer program product according to embodiments of the present disclosure. It should be understood that each block of the flow chart and/or block diagram and combinations of each block in the flow chart and/or block diagram may be implemented by the computer-readable program instructions.

The computer-readable program instructions may be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions may also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions may also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram may represent a module, a part of program segment or code, wherein the module and the part of program segment or code include one or more executable instructions for performing stipulated logic functions. In some alternative implementations, it should be noted that the functions indicated in the block may also take place in an order different from the one indicated in the drawings. For example, two successive blocks may be in fact executed in parallel or sometimes in a reverse order dependent on the involved functions. It should also be noted that each block in the block diagram and/or flow chart and combinations of the blocks in the block diagram and/or flow chart may be implemented by a hardware-based system exclusive for executing stipulated functions or actions, or by a combination of dedicated hardware and computer instructions.

Various embodiments of the present disclosure have been described above and the above description is only by way of example rather than exhaustive and is not limited to the embodiments disclosed herein. Many modifications and alterations, without deviating from the scope and spirit of the explained various embodiments, are obvious for those skilled in the art. The selection of terms in the text aims to best explain principles and actual applications of each embodiment and technical improvements made to the technology in the market by each embodiment, or enable other ordinary skilled in the art to understand embodiments of the present disclosure.

We claim:

1. A method of resource configuration, comprising:
   determining a current workload of a storage system for a resource quota checking task for a file system on the storage system; and adaptively adjusting a number of scanning processes employed in the resource quota checking task to scan the file system based on the determined current workload, the adaptively adjusting the number of scanning processes comprising:
  in response to the current workload of the storage system determined for the resource quota checking task exceeding a predetermined upper threshold, adaptively adjusting the number of scanning processes employed in the resource quota checking task to a first reduced number of scanning processes to avoid an excessive total workload of the storage system, and scanning the file system by executing the first reduced number of scanning processes; and
  in response to the current workload of the storage system determined for the resource quota checking task being below a predetermined lower threshold, adaptively adjusting the number of scanning processes employed in the resource quota checking task to a second increased number of scanning processes to avoid a waste of resources of the storage system, and scanning the file system by executing the second increased number of scanning processes, the second increased number being greater than the first reduced number.

2. The method of claim 1, further comprising:
in response to the current workload being between the predetermined upper threshold and the predetermined lower threshold, adaptively adjusting the number of scanning processes employed in the resource quota checking task to a third number of scanning processes, and scanning the file system by executing the third number of scanning processes, the third number being between the first reduced number and the second increased number.

3. The method of claim 1, wherein determining the current workload of the storage system includes determining the current workload based on at least one of:
a total number of processes running in the storage system, utilization of a central processing unit (CPU) of the storage system, and utilization of a memory.

4. The method of claim 1, further comprising:
determining a priority of the resource quota checking task based at least in part on the number of scanning processes employed in the resource quota checking task; and
recording information and the priority of the resource quota checking task in a task list of the storage system, so as to schedule the resource quota checking task according to the priority.

5. The method of claim 4, wherein the priority of the resource quota checking task is further determined based on at least one of:
the current workload of the storage system, and a running time of the resource quota checking task.

6. An electronic device, comprising:
a processor; and
a memory coupled to the processor, the memory having instructions stored therein, wherein the instructions, when executed by the processor, cause the device to perform actions comprising:
  determining a current workload of a storage system for a resource quota checking task for a file system on the storage system; and
  adaptively adjusting a number of scanning processes employed in the resource quota checking task to scan the file system based on the determined current workload, the adaptively adjusting the number of scanning processes comprising:
    in response to the current workload of the storage system determined for the resource quota checking task exceeding a predetermined upper threshold, adaptively adjusting the number of scanning processes employed in the resource quota checking task to a first reduced number of scanning processes to avoid an excessive total workload of the storage system, and scanning the file system by executing the first reduced number of scanning processes; and
    in response to the current workload of the storage system determined for the resource quota checking task being below a predetermined lower threshold, adaptively adjusting the number of scanning processes employed in the resource quota checking task to a second increased number of scanning processes to avoid a waste of resources of the storage system, and scanning the file system by executing the second increased number of scanning processes, the second increased number being greater than the first reduced number.

7. The electronic device of claim 6, wherein the actions further comprise:
in response to the current workload being between the predetermined upper threshold and the predetermined lower threshold, adaptively adjusting the number of scanning processes employed in the resource quota checking task to a third number of scanning processes, and scanning the file system by executing the third number of scanning processes, the third number being between the first reduced number and the second increased number.

8. The electronic device of claim 6, wherein determining the current workload of the storage system includes determining the current workload based on at least one of:
a total number of processes running in the storage system, utilization of a central processing unit (CPU) of the storage system, and utilization of a memory.

9. The electronic device of claim 8, wherein the actions further comprise:
determining a priority of the resource quota checking task based at least in part on a number of scanning processes employed in the resource quota checking task; and
recording information and the priority of the resource quota checking task in a task list of the storage system, so as to schedule the resource quota checking task according to the priority.

10. The electronic device of claim 9, wherein the priority of the resource quota checking task is further determined based on at least one of:
the current workload of the storage system, and a running time of the resource quota checking task.

11. A computer program product having a non-transitory computer readable medium which stores a set of instructions to perform resource configuration; the set of instructions, when carried out by computerized circuitry, causing the computerized circuitry to perform a method of:
determining a current workload of a storage system for a resource quota checking task for a file system on the storage system; and
adaptively adjusting a number of scanning processes employed in the resource quota checking task to scan the file system based on the determined current workload, the adaptively adjusting the number of scanning processes comprising:
  in response to the current workload of the storage system determined for the resource quota checking task exceeding a predetermined upper threshold, adaptively adjusting the number of scanning processes employed in the resource quota checking task to a first reduced number of scanning processes to avoid an excessive total workload of the storage system, and scanning the file system by executing the first reduced number of scanning processes; and
  in response to the current workload of the storage system determined for the resource quota checking task being below a predetermined lower threshold, adaptively adjusting the number of scanning processes employed in the resource quota checking task to a second increased number of scanning processes to avoid a waste of resources of the storage system, and scanning the file system by executing the second increased number of scanning processes, the second increased number being greater than the first reduced number.

12. The computer program product of claim 11, wherein the method further comprises:
  in response to the current workload being between the predetermined upper threshold and the predetermined lower threshold, adaptively adjusting the number of scanning processes employed in the resource quota checking task to a third number of scanning processes and scanning the file system by executing the third number of scanning processes, the third number being between the first reduced number and the second increased number.

13. The computer program product of claim 11, wherein determining the current workload of the storage system includes determining the current workload based on at least one of:
  a total number of processes running in the storage system, utilization of a central processing unit (CPU) of the storage system, and utilization of a memory.

14. The computer program product of claim 11, wherein the method further comprises:
  determining a priority of the resource quota checking task based at least in part on the number of scanning processes employed in the resource quota checking task; and
  recording information and the priority of the resource quota checking task in a task list of the storage system, so as to schedule the resource quota checking task according to the priority.

15. The computer program product of claim 14, wherein the priority of the resource quota checking task is further determined based on at least one of:
  the current workload of the storage system, and a running time of the resource quota checking task.

16. The method of claim 1, wherein the predetermined lower threshold indicates that the storage system is in an idle state, and wherein the method further comprises:
  in response to the storage system being in the idle state, adaptively adjusting the number of scanning processes employed in the resource quota checking task to the second increased number of scanning processes.

17. The method of claim 1 further comprising:
  in response to the second increased number of scanning processes exceeding a predetermined maximum number of scanning processes, adaptively adjusting the number of scanning processes employed in the resource quota checking task to the predetermined maximum number of scanning processes.

18. The method of claim 1 further comprising:
  obtaining a difference number of scanning processes by determining a difference between the second increased number of scanning processes and the first reduced number of scanning processes,
  wherein adaptively adjusting the number of scanning processes employed in the resource quota checking task to the second increased number of scanning processes includes adaptively adjusting the number of scanning processes employed in the resource quota checking task to the first reduced number of scanning processes plus the difference number of scanning processes.

19. The method of claim 1 wherein the adaptively adjusting the number of scanning processes further comprises:
  periodically checking the resource quota checking task; and
  adaptively adjusting the number of scanning processes employed in the resource quota checking task based on the current workload of the storage system at each time when the resource quota checking task is periodically checked.

* * * * *